(12) United States Patent
Shimizu et al.

(10) Patent No.: US 10,416,641 B2
(45) Date of Patent: Sep. 17, 2019

(54) OPERATION PROGRAM EDITING DEVICE AND METHOD FOR EDITING OPERATION PROGRAM

(71) Applicants: JTEKT CORPORATION, Osaka-shi (JP); TOYOTA JIDOSHA KABUSHIKI KAISHA, Toyota-shi (JP)

(72) Inventors: Akihiro Shimizu, Kariya (JP); Terukazu Senda, Obu (JP); Masanori Muramatsu, Kariya (JP); Kouji Hamakawa, Miyoshi (JP); Kenzou Mima, Toyota (JP); Kouji Yamashiro, Miyoshi (JP)

(73) Assignees: JTEKT CORPORATION, Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 341 days.

(21) Appl. No.: 14/991,196

(22) Filed: Jan. 8, 2016

(65) Prior Publication Data

US 2016/0202685 A1 Jul. 14, 2016

(30) Foreign Application Priority Data

Jan. 9, 2015 (JP) ................................. 2015-003648

(51) Int. Cl.
*G05B 19/042* (2006.01)
(52) U.S. Cl.
CPC ..... *G05B 19/0426* (2013.01); *G05B 2219/23328* (2013.01)
(58) Field of Classification Search
CPC ........... G05B 19/0426; G05B 19/4147; G05B 19/4067; G05B 19/042; G05B 2219/23328

(Continued)

(56) References Cited

U.S. PATENT DOCUMENTS 5,590,253 A * 12/1996 Onishi ................. G06T 11/206
345/619
5,841,656 A * 11/1998 Taruishi .................... G06F 8/34
700/86

(Continued)

FOREIGN PATENT DOCUMENTS

CN 101187815 A 5/2008
CN 103119525 A 5/2013

(Continued)

OTHER PUBLICATIONS

Office Action dated Jan. 21, 2019 in Chinese Application No. 201610011969.8, along with an English translation.

(Continued)

*Primary Examiner* — Robert E Fennema
*Assistant Examiner* — Santosh R Poudel
(74) *Attorney, Agent, or Firm* — Oblon, McClelland, Maier & Neustadt, L.L.P.

(57) ABSTRACT

An operation program editing device includes a program editing portion configured to edit an operation program executable by a programmable controller that controls a facility, and the program editing portion includes a bypass circuit generation unit that generates a bypass circuit including a bypass path for skipping execution of some of the plurality of steps at a time of reactivation of the facility, a first selection receiving unit that receives selection of a last step, from among the plurality of steps, within a range where the execution is skipped by the bypass circuit, and a second selection receiving unit that receives selection of a first step, from among the plurality of steps, within the range where the execution is skipped by the bypass circuit.

15 Claims, 8 Drawing Sheets

(58) Field of Classification Search
USPC .......................................................... 700/87
See application file for complete search history.

(56) References Cited

U.S. PATENT DOCUMENTS

| | | | | |
|---|---|---|---|---|
| 6,290,403 | B1* | 9/2001 | Onishi | G05B 19/0426 |
| | | | | 712/200 |
| 6,859,898 | B1* | 2/2005 | Yamashita | G05B 19/056 |
| | | | | 700/26 |
| 9,483,041 | B2* | 11/2016 | Kito | G05B 19/409 |
| 2002/0024540 | A1* | 2/2002 | McCarthy | H04M 1/72566 |
| | | | | 715/844 |
| 2005/0113958 | A1* | 5/2005 | Shimizu | G05B 19/4068 |
| | | | | 700/181 |
| 2006/0031715 | A1 | 2/2006 | Klein et al. | |
| 2008/0126973 | A1 | 5/2008 | Kline | |
| 2013/0104101 | A1* | 4/2013 | Yamaoka | G06F 8/30 |
| | | | | 717/113 |

FOREIGN PATENT DOCUMENTS

| | | |
|---|---|---|
| CN | 103345414 A | 10/2013 |
| JP | 09-134210 A | 5/1997 |
| JP | 2006-195590 A | 7/2006 |
| JP | 2008-97079 | 4/2008 |
| JP | 2008-282343 A | 11/2008 |
| WO | 2013/038556 A1 | 3/2013 |

OTHER PUBLICATIONS

Office Action dated Feb. 19, 2019 in Japanese Patent Application No. 2015-003648, along with a partial English translation.
Office Action dated Jul. 16, 2019 in Japanese Application No. 2015-003684, along with a partial English translation

* cited by examiner

OPERATION PROGRAM EDITING DEVICE AND METHOD FOR EDITING OPERATION PROGRAM

INCORPORATION BY REFERENCE

The disclosure of Japanese Patent Application No. 2015-003648 filed on Jan. 9, 2015 including the specification, drawings and abstract is incorporated herein by reference in its entirety.

BACKGROUND OF THE INVENTION

1. Field of the Invention

The present invention relates to an operation program editing device configured to edit an operation program for a programmable controller, the operation program being described to include a plurality of steps each indicative of an individual control process and a transition indicative of a transition condition between the plurality of steps, and a method for the operation program editing device to edit the operation program.

2. Description of Related Art

Conventionally, as a programming language for a programmable controller that controls a facility such as a machine tool, a ladder logic (a ladder language), a sequential function chart (a SFC language), a function block diagram (a FBD language), and the like have been known, as prescribed in the IEC61131-3 standard. Among them, the SFC language is a format that describes a flow of an individual control process like a flowchart. Since the SFC language has high clarity, the SFC language has been widely used in recent years.

In the meantime, a program described by the SFC language is described on the presumption that a plurality of steps each indicative of an individual control process is executed sequentially from the top. Accordingly, in a case where execution of the program described by the SFC language stops halfway due to some troubles while a programmable controller is executing the program described by the SFC language, it is difficult to restart a control process of a step subsequent to a step at which the troubles occur, at the time of reactivation after troubleshooting.

In view of such problems, the applicant of the present application has proposed a programmable controller that can appropriately reactivate a program described by the SFC language after the program stops halfway (see Japanese Patent Application Publication No. 2008-97079 (JP 2008-97079 A)).

However, the programmable controller described in JP 2008-97079 A assigns a ladder program described by the ladder language to each transition indicative of a transition condition between steps, and the ladder program is constituted by combining a halfway activation flag that is turned on when the ladder program is reactivated, an activation condition of a step just before each transition, and the like. Therefore, it takes time for a programming operation of the ladder program. Further, a content of such an operation program is not shown in the SFC language expressed like a flowchart, so there is also a problem that a third person (e.g., a person in charge of facility maintenance) except an editor of the program is hard to understand the content. Thus, the programmable controller described in JP 2008-97079 A left room for improvement.

SUMMARY OF THE INVENTION

The present invention provides an operation program editing device that can easily form an operation program described by a SFC language such that the operation program can be reactivated after halfway stop and an operation content thereof is surely understandable even for a third person and a method for editing the operation program.

An aspect of the present invention provides an operation program editing device including: a program editing portion configured to edit an operation program executable by a programmable controller that controls a facility; and a display portion configured to display the operation program that is being edited, wherein: the operation program is described to include a plurality of steps each indicative of an individual control process and a transition indicative of a transition condition between the plurality of steps, and the operation program is configured such that, at the time of reactivation after halfway stop during a continuous operation in which the plurality of steps is continuously executed from an upstream side to a downstream side, the execution is restarted from a step on an uppermost stream side among the plurality of steps; and the program editing portion includes a bypass circuit generation unit that generates a bypass circuit including a bypass path for skipping execution of some of the plurality of steps at the time of the reactivation, a first selection receiving unit that receives selection of a last step, from among the plurality of steps, within a range where the execution is skipped by the bypass circuit, and second selection receiving unit that receives selection of a first step, from among the plurality of steps, within the range where the execution is skipped by the bypass circuit.

Further, another aspect of the present invention provides a method for editing an operation program executable by a programmable controller that controls a facility. The operation program is described to include a plurality of steps each indicative of an individual control process and a transition indicative of a transition condition between the plurality of steps, and the operation program is configured such that, at a time of reactivation after halfway stop during a continuous operation in which the plurality of steps is continuously executed from an upstream side to a downstream side, the execution is restarted from a step on an uppermost stream side among the plurality of steps. The operation program is edited to include: i) a process of generating a bypass circuit including a bypass path for skipping execution of some of the plurality of steps at the time of the reactivation; ii) a process of receiving a selection of a last step, from among the plurality of steps, within a range where the execution is skipped by the bypass circuit; and iii) a process of receiving a selection of a first step, from among the plurality of steps, within the range where the execution is skipped by the bypass circuit.

According to the aspects of present invention, it is possible to easily form an operation program described by a SFC language such that the operation program can be reactivated after halfway stop and an operation content thereof is surely understandable even for a third person.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of the present invention with reference to FIGS. 1 to 8. Note that the embodiment described below indicates one preferred concrete example on performing the present invention. There are some parts that specifically exemplify various technical matters that are technically preferable, but a technical scope of the present invention is not limited to such concrete examples.

Figure 1:
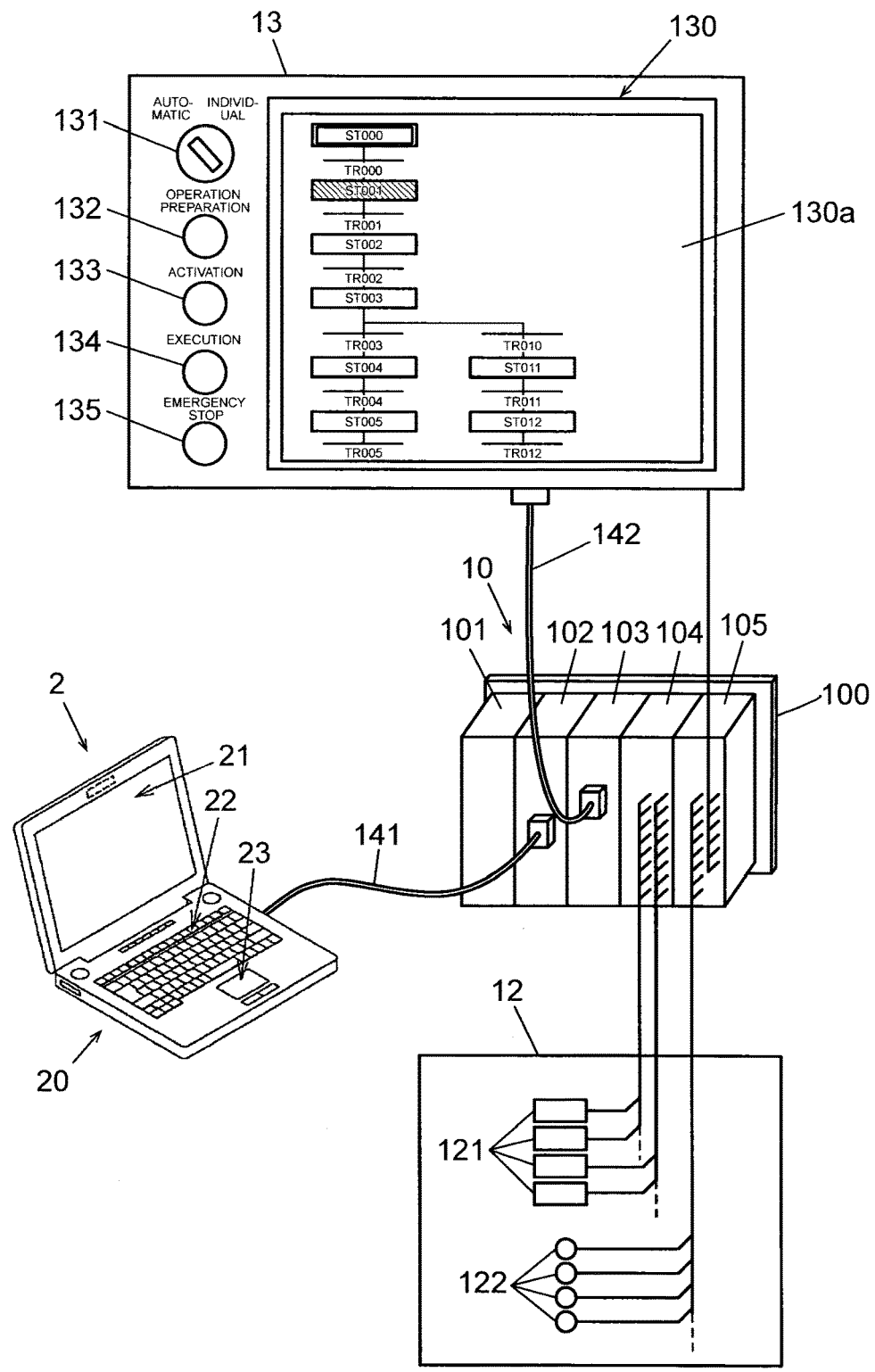
FIG. 1 is a configuration diagram illustrating an operation program editing device according to an embodiment of the present invention together with a programmable controller, a control target facility, and an operating panel.

FIG. 1 is a configuration diagram illustrating an operation program editing device 2 according to the embodiment of the present invention together with a programmable controller 10, a control target facility 12, and an operating panel 13.

The operation program editing device 2 is constituted by an information processor provided with a display screen. In the present embodiment, the operation program editing device 2 is constituted by a handheld computer (a notebook computer) including: a body portion 20 including a MPU (micro-processing unit), a peripheral circuit, and so on; a display 21 serving as a display portion; a keyboard 22 serving as a text input portion; and a touchpad 23 serving as a pointing device.

The operation program editing device 2 has a function to edit an operation program executed by the programmable controller 10, and a function to transfer the operation program thus edited to the programmable controller 10 via a communication cable 141. The operation program is constituted by a SFC program described by a SFC language, and a ladder program described by a ladder language and assigned to each step and each transition (described later) of the SFC program.

The programmable controller 10 is constituted by a power supply module 101, a CPU module 102, a communication module 103, an output module 104, an input module 105, and a base 100 on which these modules are mounted. The power supply module 101 supplies power supplies to the CPU module 102 and so on via the base 100. The communication module 103 performs communication with a monitoring device 130 of the operating panel 13.

The output module 104 has a plurality of output contact points connected to a plurality of actuators 121 provided in the facility 12. The plurality of actuators 121 is constituted by a solenoid, a motor, an electromagnetic selector valve that controls a hydraulic pressure, or the like, for example. The input module 105 has a plurality of input contact points connected to a plurality of sensors 122 provided in the facility 12. The plurality of sensors 122 is constituted by a proximity sensor, a photoelectronic sensor, a limit switch, or the like, for example.

The CPU module 102 executes the operation program edited by the operation program editing device 2 to turn on/off each of the output contact points of the output module 104 according to a state or the like of each of the input contact points of the input module 105, thereby controlling the facility 12. In the present embodiment, the facility 12 is a machine tool, and in a state where a workpiece carried therein is clamped, the facility 12 performs a predetermined machining operation such as cutting or grinding.

The operating panel 13 includes a monitoring device 130 provided with an indicator, an automatic/individual selecting switch 131, an operation preparation switch 132, an activation switch 133, an execution switch 134, and an emergency stop switch 135. The automatic/individual selecting switch 131 is a switch that switches between an automatic operation mode in which an operation is continuously performed according to the operation program edited by the operation program editing device 2, and an individual operation mode in which the actuators 121 of the facility 12 are caused to perform individual operations. The operation preparation switch 132 is a switch that allows the actuators 121 of the facility 12 to operate. The activation switch 133 is a switch that instructs activation of an automatic operation. The execution switch 134 is a switch that instructs execution of the individual operations in the individual operation mode. The emergency stop switch 135 is a switch that immediately stops the operation of the facility 12. These switches 131 to 135 are connected to the input module 105 of the programmable controller 10.

The monitoring device 130 is connected to the communication module 103 of the programmable controller 10 via the communication cable 142, so that the monitoring device 130 can read out, as needed, an on/off state of each of the output contact points of the output module 104, an on/off state of each of the input contact points of the input module 105, and on/off states of various flags stored in the CPU module 102. Further, the monitoring device 130 can read out an operation program stored in the CPU module 102, from the programmable controller 10. The monitoring device 130 displays, on a display screen 130a of the indicator, an execution state of the operation program by the CPU module 102 of the programmable controller 10 as needed.

The SFC program edited by the operation program editing device 2 is described to include a plurality of steps each indicative of an individual control process, and a transition indicative of a transition condition between the plurality of steps. Further, at the time of reactivation after halfway stop during a continuous operation of the facility 12 in which the plurality of steps is continuously executed from an upstream side to a downstream side, execution of the SFC program is restarted from a step on an uppermost stream side among the plurality of steps by the CPU module 102 of the programmable controller 10.

The monitoring device 130 displays, on the display screen 130a, a step that is being executed by the CPU module 102 and its previous and subsequent steps. At this time, the monitoring device 130 displays the step that is being executed by the CPU module 102 so that the step can be distinguished from the other steps by using different display colors, for example. In the example illustrated in FIG. 1, the step that is being executed by the CPU module 102 is indicated by hatching.

Figure 2:
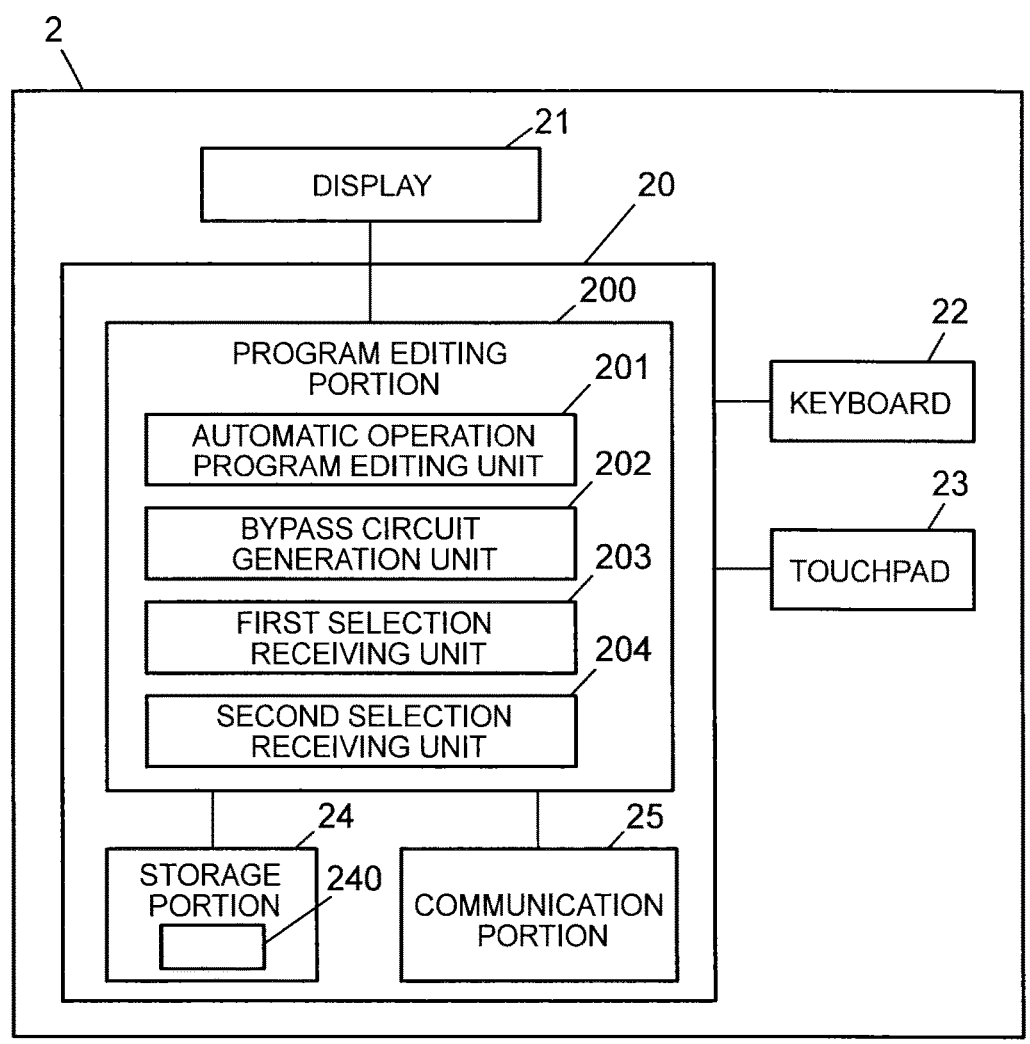
FIG. 2 is a block diagram illustrating a functional configuration of an operation program editing device.

FIG. 2 is a block diagram illustrating a functional configuration of the operation program editing device 2. The operation program editing device 2 includes the body portion 20 having a program editing portion 200 for editing an operation program executable by the programmable controller 10, the display 21 for displaying an operation program that is being edited, the keyboard 22, and the touchpad 23. The body portion 20 further includes a storage portion 24 for storing the operation program edited by the program editing portion 200, and a communication portion 25 for performing communication with the programmable controller 10. The storage portion 24 is constituted by a hard disk, a semiconductor memory, and the like, for example.

Note that, instead of the touchpad 23, a mouse or a track ball, for example, can be used as the pointing device. Further, in a case where the display 21 is constituted by a display device such as a liquid crystal panel and a position input device such as a touchpad in combination, the position input device can be used as the pointing device, and further, by selecting letters displayed on the display device by a touch operation on the position input device, it is possible to perform text entry instead of the keyboard 22.

When the MPU executes a program installed in advance in the operation program editing device 2, the program editing portion 200 operates as an automatic operation program editing unit 201, a bypass circuit generation unit 202, a first selection receiving unit 203, and a second selection receiving unit 204. In the following description, in order to clearly distinguish the program for causing a computer to operate as the operation program editing device 2 from the operation program executed by the programmable controller 10, the program for causing the computer to operate as the operation program editing device 2 is referred to as an "application program 240." The application program 240 is provided via a storage medium such as a CD-ROM or a telecommunication circuit such as the Internet, for example, and stored in the storage portion 24.

The automatic operation program editing unit 201 edits an automatic operation program for causing the facility 12 to operate automatically, by operations on the keyboard 22 and the touchpad 23 by a user. At the time of reactivation after the facility 12 stops halfway during the continuous operation of the facility 12 by the automatic operation program, the bypass circuit generation unit 202 generates a bypass circuit for skipping execution of some of the plurality of steps. That is, the bypass circuit generation unit 202 adds a bypass circuit to the automatic operation program edited by the automatic operation program editing unit 201. That is, a process of generating the bypass circuit including a bypass path for skipping execution of some of the plurality of steps at the time of the reactivation is executed.

The first selection receiving unit 203 receives selection of a last step, from among the plurality of steps, within a range where the execution is skipped by the bypass circuit generated by the bypass circuit generation unit 202. That is, a process of receiving a selection of a last step, from among the plurality of steps, within a range where the execution is skipped by the bypass circuit is executed. The second selection receiving unit 204 receives selection of a first step, from among the plurality of steps, within the range where the execution is skipped by the bypass circuit generated by the bypass circuit generation unit 202. That is, a process of receiving a selection of a first step, from among the plurality of steps, within the range where the execution is skipped by the bypass circuit is executed.

Hereinafter, the first step within the range where the execution is skipped by the bypass circuit is referred to as a "bypass initial step," and the last step within the range where the execution is skipped by the bypass circuit is referred to as a "bypass last step."

Figure 3:
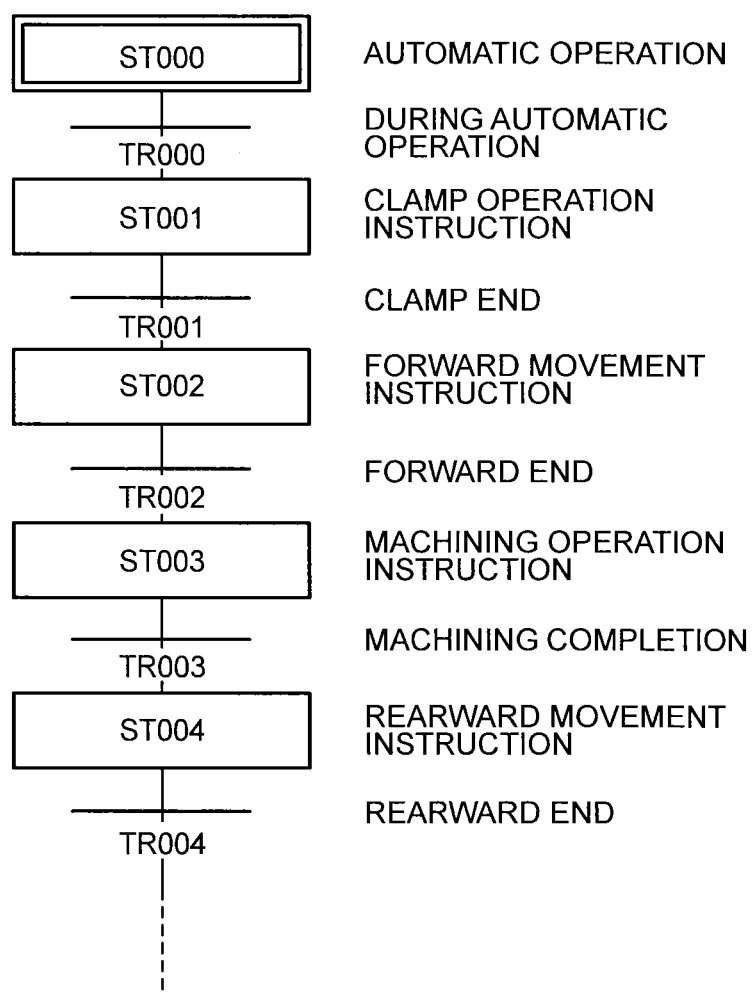
FIG. 3 illustrates one example of a SFC program edited by an automatic operation program editing unit.

FIG. 3 illustrates one example of a SFC program edited by the automatic operation program editing unit 201. The SFC program is described in accordance with the IEC61131-3 standard such that a plurality of steps each indicative of an individual control process, and a transition indicative of a transition condition between the steps are described alternately. An initial step "ST000" of the SFC program is a step indicative of an automatic operation. At the start of the automatic operation, the programmable controller 10 sequentially executes control processes of respective steps from "ST000" corresponding to an uppermost stream of the SFC program toward a downstream side.

The SFC program illustrated in FIG. 3 is configured to sequentially execute the control processes of respective steps of a clamp operation instruction (ST001), a forward movement instruction (ST002), a machining operation instruction (ST003), and a rearward movement instruction (ST004).

In order to execute the process of the step of the forward movement instruction (ST002) after the control process of the step of the clamp operation instruction (ST001) is executed, it is necessary to pass a transition "TR001." The step of the forward movement instruction (ST002) is one downstream step after the step of the clamp operation instruction (ST001). A transition condition of the transition "TR001" is a "clamp end." Accordingly, for example, when the input module 105 receives, from the sensor 122, a signal indicating that a clamper for clamping a workpiece moves to the clamp end in the facility 12, the transition condition is satisfied, so that the transmission "TR001" can be passed. Hereby, the programmable controller 10 executes the forward movement instruction (ST002), which is a step right under the transition "TR001." The forward movement instruction is an instruction of an operation to move forward a machining device toward the workpiece. Similarly, when a transition condition of each transition (TR002, TR003, TR004) is satisfied, a control process of one downstream step after the each transition is executed.

A ladder program is assigned to each of the steps and the transitions. The ladder program assigned to each of the steps is a program for turning on the output contact points of the output module 104 which are connected to the actuators 121 of the facility 12, under a predetermined condition. The predetermined condition includes various interlock signals or the like to ensure the safety of the operation of the facility 12. The ladder program assigned to each of the transitions includes the input contact points of the input module 105 which indicate that an operation of a control process of a step just before the each of the transitions is completed, and a transition condition to a subsequent step is set therein.

Here, the facility 12 may stop halfway due to various factors during the automatic operation. For example, in a case where a cutting tool for use in machining on the workpiece is damaged during the machining of the workpiece by the machining operation instruction (ST003) and the machining cannot be completed, the transition condition of the transition "TR003" is not satisfied, so that the facility 12 stops halfway. In such a case, a person in charge of maintenance checks during which step the facility 12 stops halfway based on a display content of the monitoring device 130, and after the power supply of the facility 12 is stopped to secure the safety and the cutting tool is replaced, the automatic/individual selecting switch 131 is switched to the individual operation mode, so that the machining is completed by an individual operation. Alternatively, in a case where the workpiece cannot but be discarded, the cutting tool is just replaced as a repair work without performing the machining by the individual operation. After that, the person in charge of maintenance further switches the automatic/individual selecting switch 131 to the automatic operation mode, so as to restart the automatic operation of the facility 12.

At this time, the programmable controller 10 performs restarting from the step of the uppermost stream side in the SFC program. However, since the workpiece has been already machined or the workpiece is in a state where the machining is not performable thereon, it is necessary to skip the steps of the forward movement instruction (ST002) and the machining operation instruction (ST003), and to execute the control process from the rearward movement instruction (ST004), which is a step subsequent to the machining operation instruction (ST003).

Conventionally, as described in JP 2008-97079 A, for example, in order to appropriately perform restarting (reactivation) of the automatic operation after such halfway stop, it is necessary to set a predetermined operation condition by use of a halfway activation flag that is turned on at the time of reactivation in the ladder program assigned to the transition, which causes such a problem that it takes time for a programming operation of the ladder program.

Figure 4:
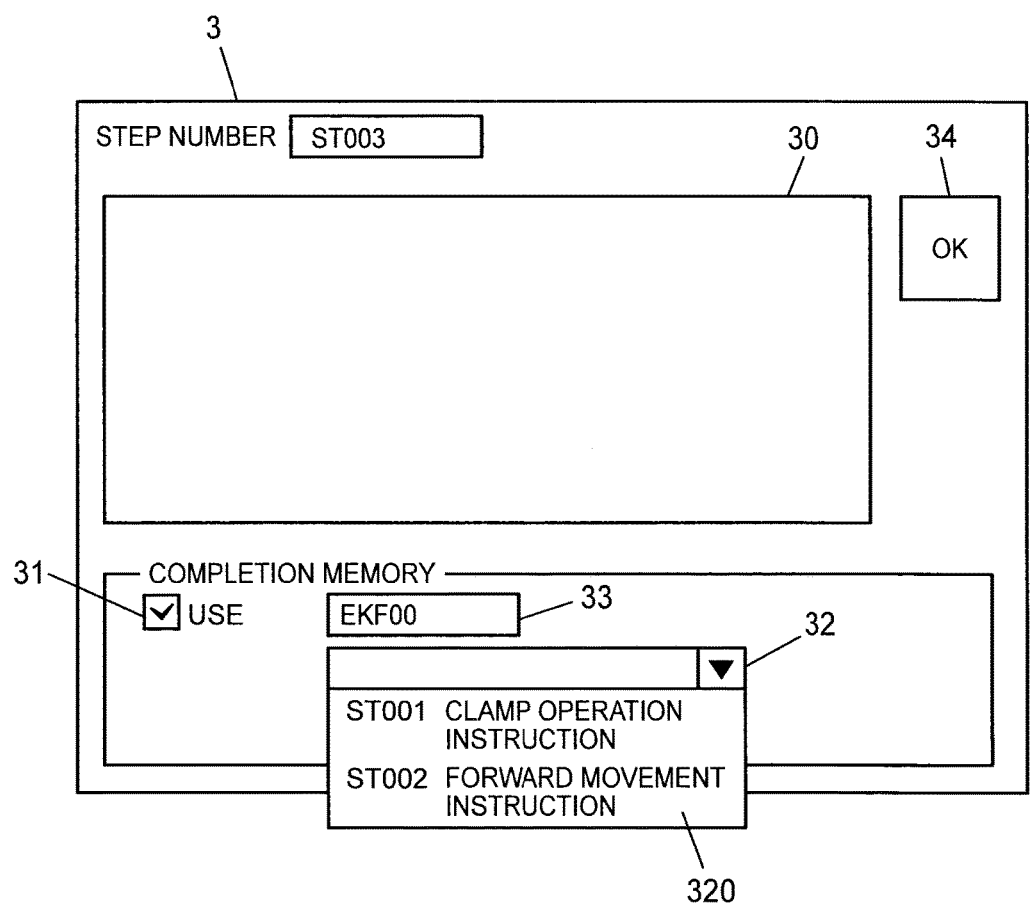
FIG. 4 illustrates one example of a dialog screen displayed on a display of the operation program editing device.
Figure 5:
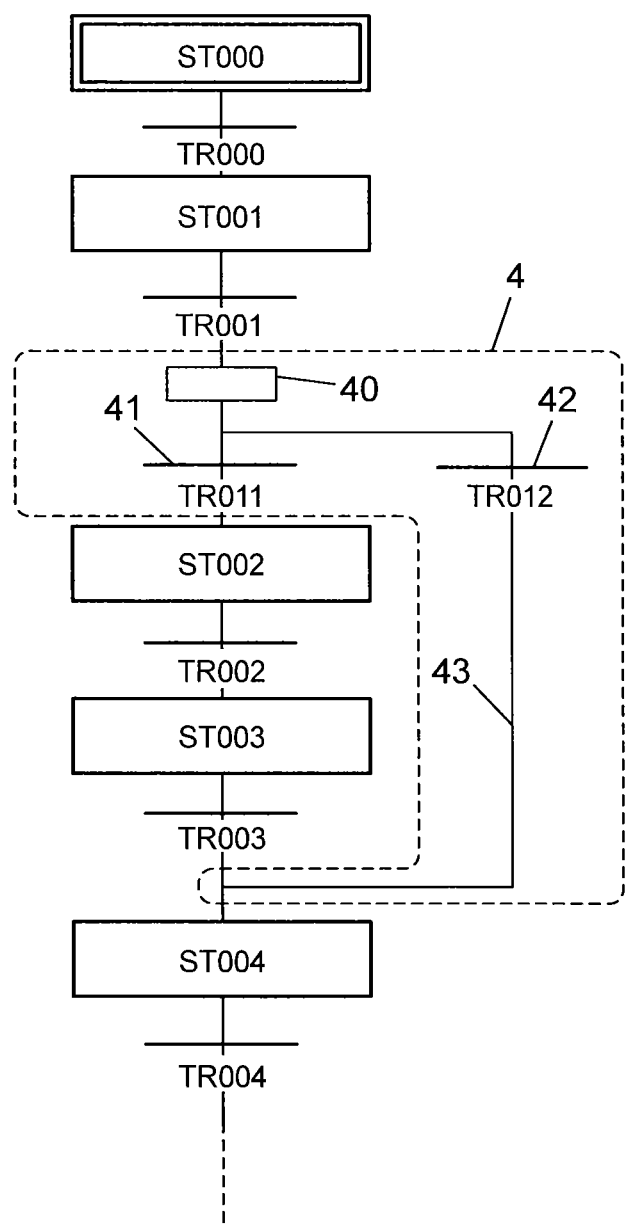
FIG. 5 illustrates one example of a SFC program to which a bypass circuit generated by a bypass circuit generation unit is added.

In view of this, in the present embodiment, a bypass circuit for appropriately reactivating the facility 12 can be generated by the bypass circuit generation unit 202, the first selection receiving unit 203, and the second selection receiving unit 204. With reference to FIGS. 4 and 5, the following more specifically describes a specific process content of the SFC program illustrated in FIG. 3 by exemplifying a case of generating a bypass circuit for skipping the control processes of "ST002" and "ST003" at the time of reactivation after halfway stop.

Measures performed by an editor of the operation program on the operation program editing device 2 in order to generate the bypass circuit is to select a bypass initial step and a bypass last step. The first selection receiving unit 203 receives selection of the bypass last step, and the second selection receiving unit 204 receives selection of the bypass initial step. The bypass circuit generation unit 202 automatically generates a bypass circuit based on receiving results of the first and second selection receiving units 203, 204.

More specifically, when the step "ST003" is specified by the operation of the touchpad 23 in a state where the SFC program illustrated in FIG. 3 is displayed on the display 21 of the operation program editing device 2, a dialog screen showing an attribute of the step "ST003" is displayed on the display 21. One example of the dialog screen is illustrated in FIG. 4.

As illustrated in FIG. 4, a check box 31 for selecting whether a completion storage function is used or not, and a drop-down button 32 for selecting a bypass initial step at the time when the completion storage function is selected are displayed on the dialog screen 3 displayed at the time when the step "ST003" is specified by the touchpad 23. The bypass initial step is a step from which execution is skipped at the time of reactivation. Here, the completion storage function is a function to store information that the control process of the step has been completed, even when the power supply of the programmable controller 10 is turned off once, for example. More specifically, by turning on the after-mentioned keep relay, information that the control process of the step has been completed is stored.

Further, on the dialog screen 3, an address of a flag to be automatically turned on at the time when the programmable controller 10 executes the control process of the step "ST003" is displayed in a display field 33. This flag is an execution flag to be in an ON state at the time of execution of the control process of the step "ST003," which is a target for the dialog screen 3. In the example shown in FIG. 4, "EKF00," which is an address of the execution flag, is displayed in the display field 33.

When a transition right under the step is established so as to proceed to a subsequent step, the execution flag automatically enters an OFF state by the process of the programmable controller 10. That is, the execution flag is not turned on/off by the ladder program, but on/off states thereof are switched by the process of the programmable controller 10 itself.

Note that, in FIG. 4, a specific content of a display area 30 for the other attribute information to be displayed on the dialog screen 3 is not illustrated.

On the dialog screen 3 displayed at the time when the step "ST003" is specified, when the editor of the operation program puts a check in the check box 31, the step "ST003" is received as the bypass last step by the program editing portion 200. That is, an operation of putting a check in the check box 31 is a setting operation of setting the step "ST003" as the last step within the range where the execution is skipped by the bypass circuit. This receiving process is performed as a function of the first selection receiving unit 203.

Further, on the dialog screen 3, when the editor of the program selects the step "ST002" from the pull-down menu 320 displayed at the time when the editor clicks the drop-down button 32, the step "ST002" is received as the bypass initial step by the program editing portion 200. At this time, the steps displayed in the pull-down menu 320 as options are steps on the upstream side relative to the step "ST003." The receiving process is performed as a function of the second selection receiving unit 204.

When the editor of the operation program clicks an "OK" button 34 on the dialog screen 3, the display of the dialog screen 3 disappears and the selection of the bypass initial step and the bypass last step is confirmed at the same time.

As such, on the dialog screen displayed at the time when one of the plurality of steps displayed on the display 21 is selected, when a setting operation of setting the selected step as the last step within the range where the execution is skipped by the bypass circuit is performed, the first selection receiving unit 203 receives the step as the bypass last step. Further, when a plurality of steps on the upstream side relative to the step thus received as the bypass last step is displayed on the dialog screen and one step is selected from among the plurality of steps thus displayed, the second selection receiving unit 204 receives the step thus selected as the bypass initial step.

When the selection of the bypass last step and the bypass initial step thus received by the first and second selection receiving units 203, 204 is confirmed, the bypass circuit generation unit 202 generates a bypass circuit, and also generates a ladder program assigned to the bypass last step and a ladder program assigned to a transition of the bypass circuit thus generated.

FIG. 5 illustrates one example of a SFC program obtained by adding, to the SFC program illustrated in FIG. 3, a bypass circuit 4 generated by the bypass circuit generation unit 202.

In FIG. 5, the bypass circuit 4 generated by the bypass circuit generation unit 202 is surrounded by a broken line.

The bypass circuit 4 includes a dummy step 40 generated as one upstream step before the step "ST002," which is the bypass initial step, a first transition (TR011) 41 generated between the dummy step and the step "ST002," a second transition (TR012) 42 generated in parallel with the first transition 41, and a bypass path 43 exhibiting a jump destination in a case where the second transition 42 is passed.

The bypass path 43 detours around the step "ST002" and the step "ST003" and connects the second transition 42 to the step "ST004," which is one downstream step after the bypass last step. That is, a connection destination of the bypass path 43 to the automatic operation program is just before the one downstream step before the bypass last step. When a transition condition of the second transition 42 is satisfied, steps after the step "ST004" including the step "ST004" are executed regardless of whether the machining is successfully completed or not, which is a transition condition of the transition "TR003."

Figure 6A:
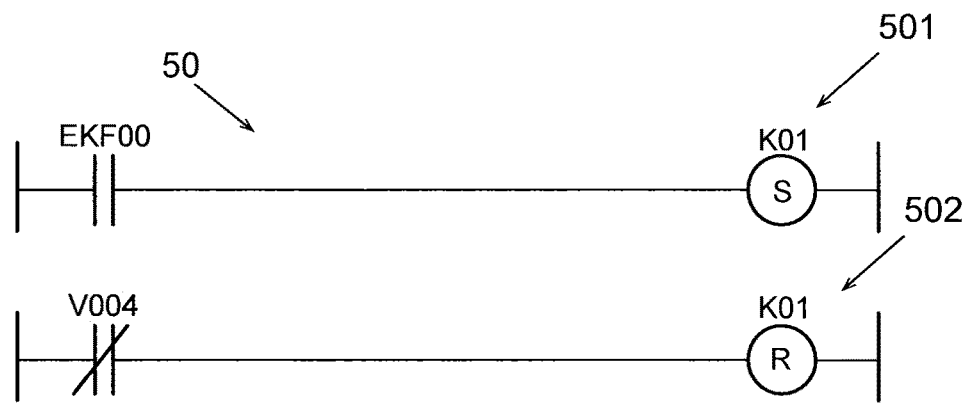
FIG. 6A illustrates one example of a ladder program generated by the bypass circuit generation unit.
Figure 6B:
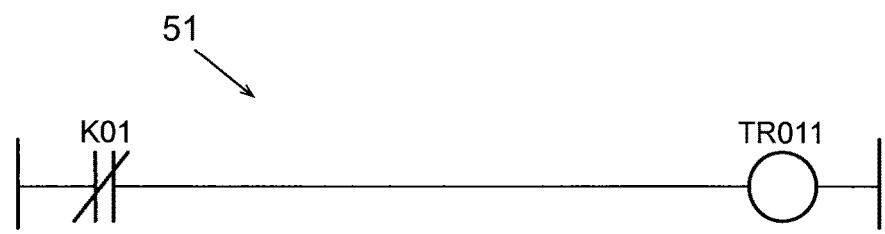
FIG. 6B illustrates one example of the ladder program generated by the bypass circuit generation unit.
Figure 6C:
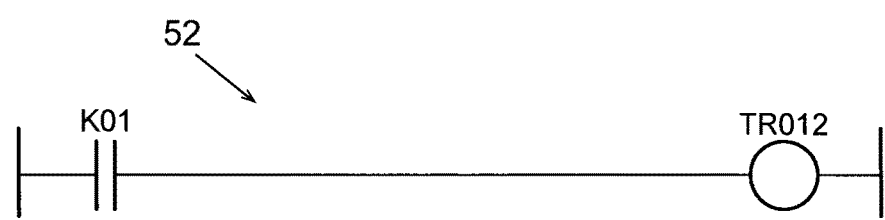
FIG. 6C illustrates one example of the ladder program generated by the bypass circuit generation unit.

FIGS. 6A to 6C each illustrate one example of the ladder program generated by the bypass circuit generation unit 202: FIG. 6A illustrates a ladder program assigned to the step "ST003," which is the bypass last step; FIG. 6B illustrates a ladder program assigned to the first transition 41; and FIG. 6C illustrates a ladder program assigned to the second transition 42.

The ladder program 50 assigned to the step "ST003" is constituted by a first circuit 501 in which a keep relay "K01" is set to an ON state when the aforementioned execution flag "EKF00" enters an ON state, and a second circuit 502 that resets the keep relay "K01" to an OFF state. The keep relay "K01" is a relay configured such that, after the keep relay "K01" is set to an ON state, the keep relay "K01" is kept in an ON state until it is reset. Even in a case where the power supply of the programmable controller 10 is stopped in a state where the keep relay "K01" is set to an ON state, when the power supply is turned on after that, the ON state is maintained.

The first circuit 501 is generated as a ladder program in which the keep relay "K01" is set in a case where the execution flag "EKF00" is in an ON state, only according to an on/off state of the execution flag "EKF00." In addition to the contact point of the execution flag "EKF00," the editor of the operation program can add contact points such as various interlock signals serving as conditions to set the keep relay "K01," to the first circuit 501 as needed.

As the second circuit 502, a circuit in which the keep relay "K01" is reset by a b-contact point (an inverting contact point) of "V04," which is a regularly ON contact point, is generated. However, the b-contact point of "V04" is regularly turned off, so the keep relay "K01" is not reset with this circuit. On this account, the editor of the operation program adds a condition setting to reset the keep relay "K01" to the second circuit 502 depending on the configuration of the facility 12. More specifically, a contact point indicating that each movable portion of the facility 12 is placed at an original position, for example, is added instead of the b-contact point of "V04."

The keep relay "K01" is used as a transition condition in the first and second transitions 41, 42. More specifically, when the keep relay "K01" is reset, a ladder program 51 configured to satisfy the transition condition is assigned to the first transition 41. Further, when the keep relay "K01" is set, a ladder program 52 configured to satisfy the transition condition is assigned to the second transition 42.

A relay "TR011" in the ladder program 51 assigned to the first transition 41 indicates a transition condition of the first transition 41. When the relay "TR011" is in an ON state, the first transition 41 can be passed. Further, a relay "TR012" in the ladder program 52 assigned to the second transition 42 indicates a transition condition of the second transition 42. When the relay "TR012" is in an ON state, the second transition 42 can be passed.

In a case where the automatic operation of the facility 12 is not started as reactivation after halfway stop but started from the step "ST000," which is an initial step of the SFC program, the keep relay "K01" is in an OFF state. Accordingly, the transition condition of the first transition 41 is satisfied, so the control process of the step "ST002" is executed subsequently to the step "ST001."

In the meantime, if the automatic operation of the facility 12 is started as reactivation after halfway stop in a state where the machining of the machining operation instruction made at the step "ST003" has not been completed, an ON state of the keep relay "K01" set by the first circuit 501 at the time of execution of the control process of the step "ST003" is maintained. Accordingly, the transition condition of the first transition 41 is not satisfied, but the transition condition of the second transition 42 is satisfied. Hereby, the bypass path 43 becomes effective, so the execution of the control processes from the step "ST002," which is the bypass initial step, to the step "ST003," which is the bypass last step, are skipped.

As such, at the time of reactivation after halfway stop, the bypass circuit generation unit 202 uses a signal (the keep relay "K01") indicating that the control process of the bypass last step (the step "ST003") selected by the first selection receiving unit 203 has been executed, as the transition condition of the second transition 42 to make the bypass path 43 effective.

Subsequently, the following describes generation of a bypass circuit in a case where the SFC program includes branches, with reference to FIGS. 7 and 8. A branch circuits usable in the SFC program includes a parallel branch circuit and a select branch circuit to be described below.

Figure 7:
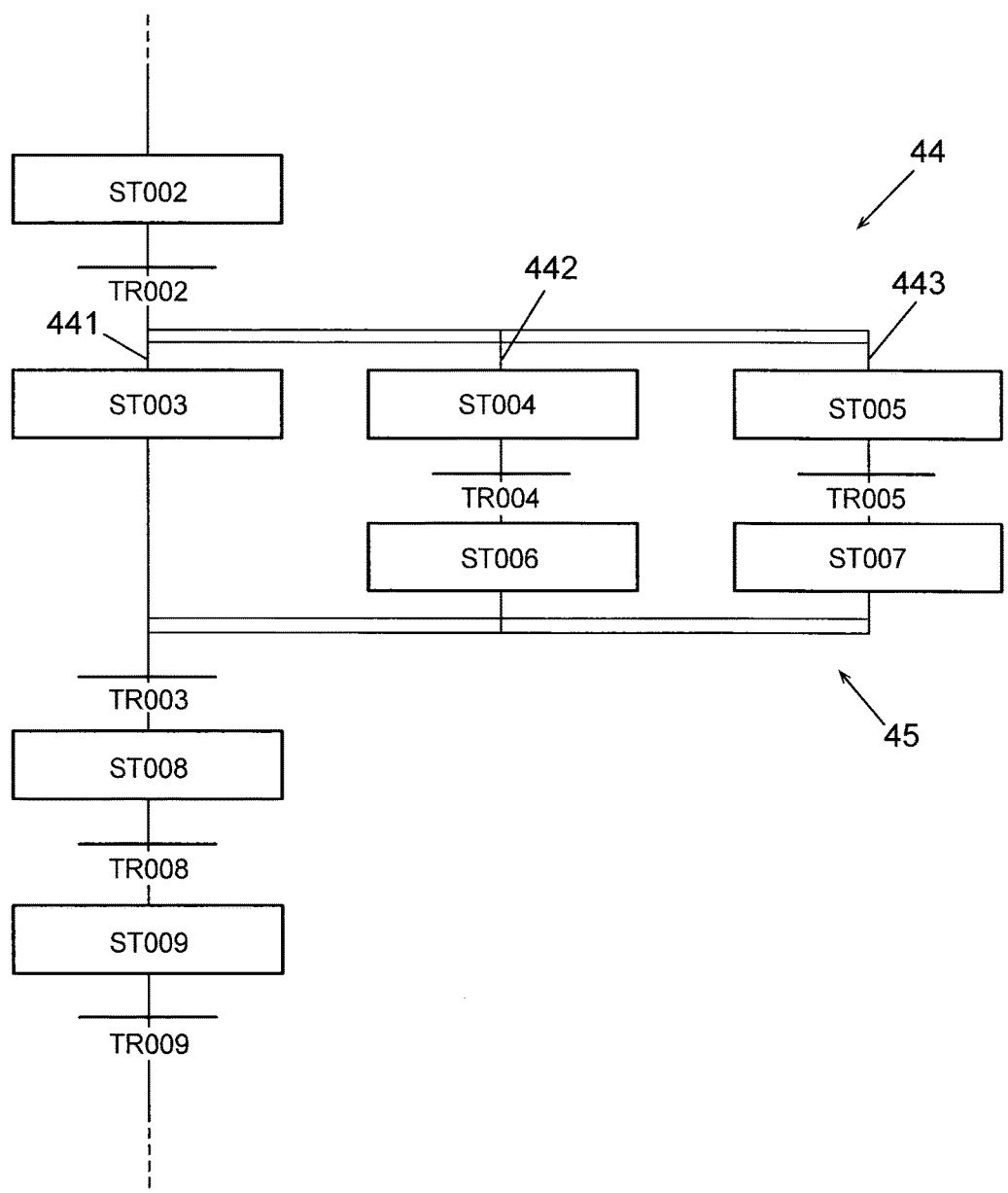
FIG. 7 illustrates one example of a SFC program including a parallel branch circuit that can execute control processes of a plurality of steps in parallel, and a merged circuit.

FIG. 7 illustrates one example of a SFC program including a parallel branch circuit 44 that can execute control processes of a plurality of steps in parallel and a merged circuit 45 that merges execution process paths for the plurality of steps, the execution process paths being branched by the parallel branch circuit 44.

Depending on a position of the bypass initial step relative to the bypass last step, the SFC program including the parallel branch circuit 44 and the merged circuit 45 may not be able to appropriately perform the operation of the facility 12 after reactivation. Accordingly, the second selection receiving unit 204 disallows selection of an inappropriate bypass initial step.

More specifically, when the bypass last step is included in one execution process path that is branched by the parallel branch circuit 44, the second selection receiving unit 204 disallows selection of steps included in the other execution process paths and steps on the upstream side relative to the parallel branch circuit 44. Further, when the parallel branch circuit 44 and the merged circuit 45 are placed on the upstream side relative to the bypass last step, the second selection receiving unit 204 disallows selection of steps between the parallel branch circuit 44 and the merged circuit 45.

In the example illustrated in FIG. 7, the execution process path for the steps is branched by the parallel branch circuit 44 into a first execution process path 441 constituted by a step "ST003," a second execution process path 442 constituted by a step "ST004" and a step "ST006," and a third execution process path 443 constituted by a step "ST005" and a step "ST007." Control processes of respective steps of the first to third execution process paths 441 to 443 are performed in parallel.

In a case where the bypass last step received by the first selection receiving unit 203 is the step ST007" of the third execution process path 443, for example, the second selection receiving unit 204 disallows selection of the step "ST003" of the first execution process path 441, the step "ST004" and the step "ST006" of the second execution process path 442, and the step "ST002" and the like on the upstream side relative to the parallel branch circuit 44, as the bypass initial step. More specifically, these steps are not displayed in the pull-down menu 320 displayed at the time when the drop-down button 32 is clicked on the dialog screen 3, and only the step "ST005," which is included in the third execution process path 443 similarly to the step "ST007" as the bypass last step and placed on the upstream side relative to the step "ST007," is displayed.

Further, in a case where the bypass last step received by the first selection receiving unit 203 is the step ST008" placed on the downstream side relative to the merged circuit 45, the second selection receiving unit 204 disallows selection of the steps "ST003" to "ST007" included in the first to third execution process paths 441 to 443, as the bypass initial step. More specifically, these steps are not displayed in the pull-down menu 320 displayed at the time when the drop-down button 32 is clicked on the dialog screen 3, but the step "ST002" and the like on the upstream side relative to the parallel branch circuit 44 is displayed.

This makes it possible to prevent generation of a bypass circuit having an inappropriate positional relationship between a bypass initial circuit and a bypass last circuit.

Figure 8:
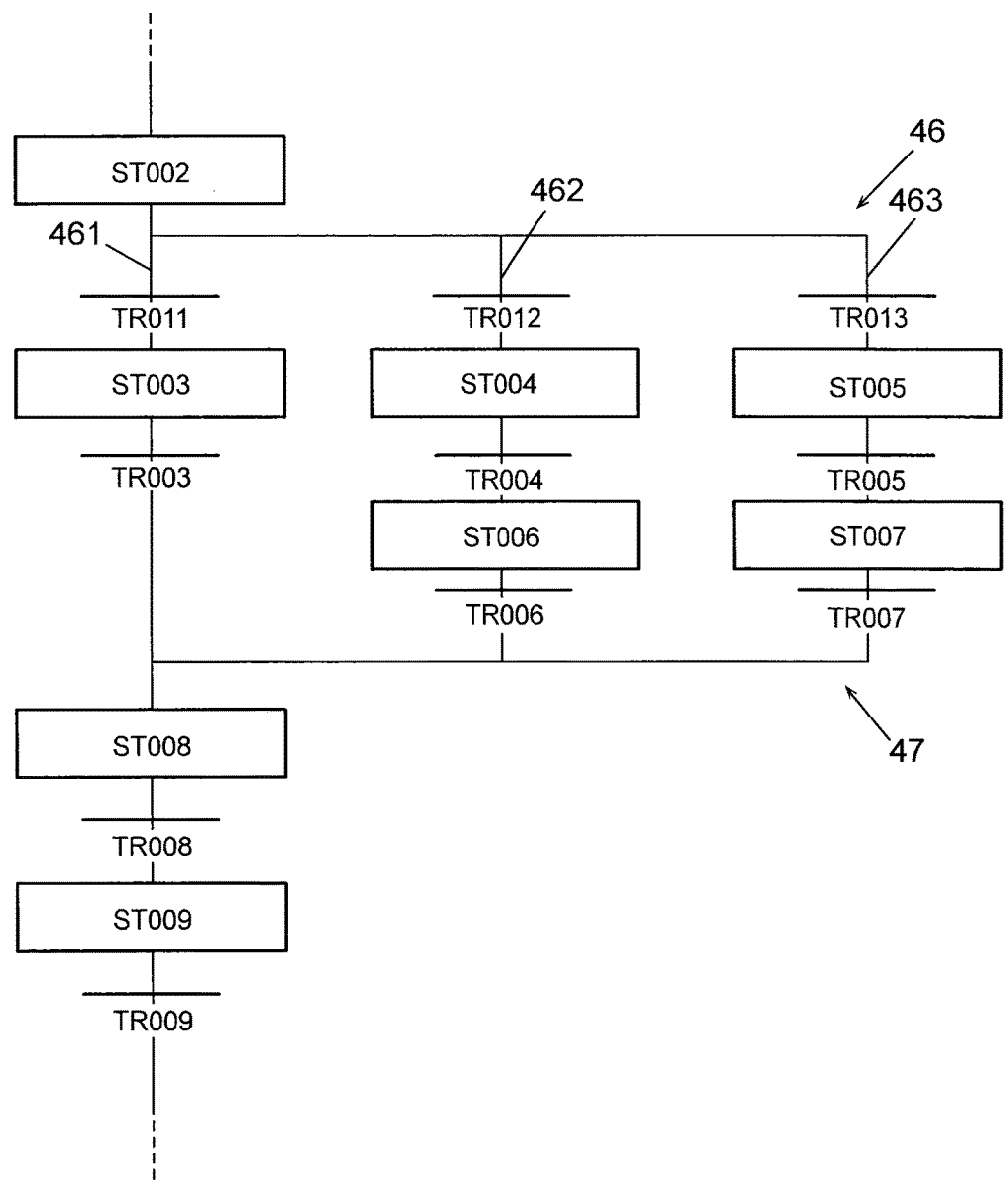
FIG. 8 illustrates one example of a SFC program including a selective branch circuit that can selectively execute control processes of a plurality of steps, and a merged circuit.

FIG. 8 illustrates one example of a SFC program including a selective branch circuit 46 that can selectively execute control processes of a plurality of steps and a merged circuit 47 that merges execution process paths for the plurality of steps, the execution process paths being branched by the selective branch circuit 46.

Even in the SFC program including the selective branch circuit 46 and the merged circuit 47, the SFC program may not be able to appropriately perform the operation of the facility 12 after reactivation depending on a position of the bypass initial step relative to the bypass last step. Accordingly, the second selection receiving unit 204 disallows selection of an inappropriate bypass initial step.

More specifically, when the bypass last step is included in one execution process path that is branched by the selective branch circuit 46, the second selection receiving unit 204 disallows selection of steps included in the other execution process paths and steps on the upstream side relative to the selective branch circuit 46. Further, when the selective branch circuit 46 and the merged circuit 47 are placed on the upstream side relative to the bypass last step, the second selection receiving unit 204 disallows selection of steps between the selective branch circuit 46 and the merged circuit 47.

In the example illustrated in FIG. 8, the execution process path for the steps is branched by the selective branch circuit 46 into a first execution process path 461 constituted by a step "ST003," a second execution process path 462 constituted by a step "ST004" and a step "ST006," and a third execution process path 463 constituted by a step "ST005" and a step "ST007." A control process of the step "ST003" of the first execution process path 461 is executed when a transition condition of a transition "TR011" is satisfied. Control processes of the steps "ST004" and "ST006" of the second execution process path 462 are executed when a transition condition of a transition "TR012" is satisfied. Further, control processes of the steps "ST005" and "ST007" of the third execution process path 463 are executed when a transition condition of a transition "TR013" is satisfied.

In a case where the bypass last step received by the first selection receiving unit 203 is the step ST007" of the third execution process path 463, for example, the second selection receiving unit 204 disallows selection of the step "ST003" of the first execution process path 461, the steps "ST004" and "ST006" of the second execution process path 462, and the step "ST002" and the like on the upstream side relative to the selective branch circuit 46, as the bypass initial step. More specifically, these steps are not displayed in the pull-down menu 320 displayed at the time when the drop-down button 32 is clicked on the dialog screen 3, but only the step "ST005," which is included in the third execution process path 463 similarly to the step "ST007" as the bypass last step and placed on the upstream side relative to the step "ST007," is displayed.

Further, in a case where the bypass last step received by the first selection receiving unit 203 is the step ST008" placed on the downstream side relative to the merged circuit 47, the second selection receiving unit 204 disallows selection of the steps "ST003" to "ST007" included in the first to third execution process paths 461 to 463, as the bypass initial step. More specifically, these steps are not displayed in the pull-down menu 320 displayed at the time when the drop-down button 32 is clicked on the dialog screen 3, but the step "ST002" and the like on the upstream side relative to the selective branch circuit 46 is displayed.

This makes it possible to prevent generation of a bypass circuit having an inappropriate positional relationship between a bypass initial circuit and a bypass last circuit.

According to the embodiment described above, it is possible to obtain the following operation/working-effects.

(1) The bypass circuit that allows reactivation after halfway stop can be generated by the bypass circuit generation unit 202 based on receiving results of the first selection receiving unit 203 and the second selection receiving unit 204. This makes it possible to easily form the bypass circuit and to reduce a burden of the editor of the operation program.

(2) Since the SFC program generated by the bypass circuit generation unit 202 is clearly shown in the SFC program, it is possible for a third person except the editor of the operation program to surely understand the operation content of the SFC program.

(3) As the transition condition of the second transition 42 to make the bypass path 43 effective at the time of reactivation after halfway stop, the bypass circuit generation unit 202 uses the keep relay "K01" indicating that the control process of the bypass last step has been completed. Accordingly, it is possible to concisely configure the ladder program assigned to the second transition 42.

(4) The first selection receiving unit 203 and the second selection receiving unit 204 receive selection of the bypass last step and the bypass initial step by the setting operation and the selection operation on the dialog screen 3. This makes it possible to further reduce a burden of the editor of the operation program.

(5) Since the second selection receiving unit 204 disallows selection of an inappropriate bypass initial step, it is possible to prevent generation of an inappropriate bypass circuit on the operation of the facility 12 beforehand.

The present invention has been described based on the embodiment, but the embodiment described above does not limit the invention according to Claims. Further, it should be noted that all combinations of features described in the embodiment may not necessarily be essential to the means for solving the problem of the invention.

Further, the present invention can be carried out with various modifications within a range that does not deviate from the gist of the present invention. For example, the above embodiment deals with a case where the application program 240 is installed in the handheld computer so as to be used as the operation program editing device 2, but the present invention is not limited to this. For example, the monitoring device 130 may have an operation editing function so as to be used as the operation program editing device.

Further, the configuration of the dialog screen 3 is not limited to the one exemplified in FIG. 4, and various configurations can be used. For example, the bypass initial step may be selected by a radio button instead of the list box. Further, in the above embodiment, the bypass last step is selected first, and then, the bypass initial step is selected. However, this order may be reversed, and the bypass initial step may be selected first, and then, the bypass last step may be selected.

Further, a target to be controlled by the programmable controller 10 is not limited to the machine tool, but is also applicable to various types of facilities such as an elevator, a vender, or a traffic light.

What is claimed is:

1. An operation program editing device comprising:
   a persistent storage configured to store an operation program executable by a programmable controller that controls a facility;
   a processor configured to edit the operation program stored in the persistent storage; and
   a display configured to display the operation program that is being edited, wherein:
   the operation program includes a plurality of steps each indicative of an individual control process and a transition indicative of a transition condition between the plurality of steps, and the operation program is configured such that, at a time of reactivation after halfway stop during a continuous operation in which the plurality of steps is continuously executed from an upstream side to a downstream side, the execution is restarted from a step on an uppermost stream side among the plurality of steps;
   the processor is configured to, before execution of the edited operation program by the programmable controller:
   generate a bypass circuit including a bypass path for skipping execution of some of the plurality of steps at the time of the reactivation,
   receive selection of a last step, from among the plurality of steps, within a range where the execution is skipped by the bypass circuit,
   receive selection of a first step, from among the plurality of steps, within the range where the execution is skipped by the bypass circuit,
   edit the operation program stored in the persistent storage based upon the generated bypass circuit,
   when one step is selected from among the plurality of steps displayed on the display and a setting operation of setting the step as the last step within the range where the execution is skipped by the bypass circuit is performed on a dialog screen displayed on the display at this time, receive the step as the last step, and
   when a plurality of steps on the upstream side relative to the last step is displayed on the dialog screen and one step is selected from among the plurality of steps thus displayed, receive the step thus selected as the first step;
   the operation program includes a branch circuit that is able to execute control processes of the plurality of steps in parallel or selectively, and a merged circuit that merges execution process paths for the plurality of steps, the execution process paths being branched by the branch circuit; and
   in a case where the last step is included in one execution process path that is branched by the branch circuit, the processor is configured to disallow selection of steps included in the other execution process paths and steps on the upstream side relative to the branch circuit as the first step.

2. The operation program editing device according to claim 1, wherein the processor is configured to use a signal indicating that a control process of the selected last step has been executed as a transition condition of a transition that makes the bypass path effective at the time of the reactivation.

3. The operation program editing device according to claim 1, wherein the processor is configured to edit the operation program stored in the persistent storage based upon the generated bypass circuit, the last step, and the first step.

4. The operation program editing device according to claim 1, wherein the circuitry is configured to edit the operation program stored in the persistent storage by including the bypass circuit in the operation program stored in the persistent storage.

5. The operation program editing device according to claim 1, wherein the bypass circuit includes two parallel transitions.

6. The operation program editing device according to claim 5, wherein the bypass circuit includes a dummy step.

7. The operation program editing device according to claim 5, wherein the bypass circuit includes a dummy step upstream of the two parallel transitions.

8. The operation program editing device according to claim 1, wherein the processor is configured to communicate the edited operation program stored in the persistent storage to the programmable controller.

9. A system comprising:
   the operation program editing device according to claim 1; and
   the programmable controller, wherein
   the processor is configured to communicate the edited operation program stored in the persistent storage to the programmable controller, and
   the programmable controller is configured to execute the edited operation program to control the facility.

10. The operation program editing device according to claim 1, wherein the persistent storage is a hard drive.

11. The operation program editing device according to claim 1, wherein the operation program stored in the persistent storage is edited before execution of the entire edited operation program by the programmable controller.

12. A method for editing an operation program executable by a programmable controller that controls a facility, wherein the operation program includes a plurality of steps each indicative of an individual control process and a transition indicative of a transition condition between the plurality of steps, and the operation program is configured such that, at a time of reactivation after halfway stop during a continuous operation in which the plurality of steps is continuously executed from an upstream side to a downstream side, the execution is restarted from a step on an uppermost stream side among the plurality of steps, the method comprises:

storing the operation program in a persistent storage; and editing the operation program stored in the persistent memory including, before execution of the edited operation by the programmable controller:

generating a bypass circuit including a bypass path for skipping execution of some of the plurality of steps at the time of the reactivation, receiving a selection of a last step, from among the plurality of steps, within a range where the execution is skipped by the bypass circuit, receiving a selection of a first step, from among the plurality of steps, within the range where the execution is skipped by the bypass circuit, editing the operation program stored in the persistent storage based upon the generated bypass circuit, when one step is selected from among the plurality of steps displayed on a display and a setting operation of setting the step as the last step within the range where the execution is skipped by the bypass circuit is performed on a dialog screen displayed on the display at this time, receiving the step as the last step, and when a plurality of steps on the upstream side relative to the last step is displayed on the dialog screen and one step is selected from among the plurality of steps thus displayed, receiving the step thus selected as the first step, the operation program includes a branch circuit that is able to execute control processes of the plurality of steps in parallel or selectively, and a merged circuit that merges execution process paths for the plurality of steps, the execution process paths being branched by the branch circuit; and in a case where the last step is included in one execution process path that is branched by the branch circuit, the method includes disallowing selection of steps included in the other execution process paths and steps on the upstream side relative to the branch circuit as the first step.

13. An operation program editing device comprising:

a persistent storage configured to store an operation program executable by a programmable controller that controls a facility;

a processor configured to edit the operation program stored in the persistent storage; and a display configured to display the operation program that is being edited, wherein:

the operation program includes a plurality of steps each indicative of an individual control process and a transition indicative of a transition condition between the plurality of steps, and the operation program is configured such that, at a time of reactivation after halfway stop during a continuous operation in which the plurality of steps is continuously executed from an upstream side to a downstream side, the execution is restarted from a step on an uppermost stream side among the plurality of steps;

the processor is configured to, before execution of the edited operation program by the programmable controller:

generate a bypass circuit including a bypass path for skipping execution of some of the plurality of steps at the time of the reactivation, receive selection of a last step, from among the plurality of steps, within a range where the execution is skipped by the bypass circuit, receive selection of a first step, from among the plurality of steps, within the range where the execution is skipped by the bypass circuit, edit the operation program stored in the persistent storage based upon the generated bypass circuit, when one step is selected from among the plurality of steps displayed on the display and a setting operation of setting the step as the last step within the range where the execution is skipped by the bypass circuit is performed on a dialog screen displayed on the display at this time, receive the step as the last step, and when a plurality of steps on the upstream side relative to the last step is displayed on the dialog screen and one step is selected from among the plurality of steps thus displayed, receive the step thus selected as the first step;

the operation program includes a branch circuit that is able to execute control processes of the plurality of steps in parallel or selectively, and a merged circuit that merges execution process paths for the plurality of steps, the execution process paths being branched by the branch circuit; and in a case where the branch circuit and the merged circuit are placed on the upstream side relative to the last step, the processor is configured to disallow selection of steps between the branch circuit and the merged circuit as the first step.

14. The operation program editing device according to claim 13, wherein the processor is configured to use a signal indicating that a control process of the selected last step has been executed as a transition condition of a transition that makes the bypass path effective at the time of the reactivation.

15. A method for editing an operation program executable by a programmable controller that controls a facility, wherein the operation program includes a plurality of steps each indicative of an individual control process and a transition indicative of a transition condition between the plurality of steps, and the operation program is configured such that, at a time of reactivation after halfway stop during a continuous operation in which the plurality of steps is continuously executed from an upstream side to a downstream side, the execution is restarted from a step on an uppermost stream side among the plurality of steps, the method comprises:

storing the operation program in a persistent storage; and editing the operation program stored in the persistent memory including, before execution of the edited operation by the programmable controller:

generating a bypass circuit including a bypass path for skipping execution of some of the plurality of steps at the time of the reactivation, receiving a selection of a last step, from among the plurality of steps, within a range where the execution is skipped by the bypass circuit, receiving a selection of a first step, from among the plurality of steps, within the range where the execution is skipped by the bypass circuit, editing the operation program stored in the persistent storage based upon the generated bypass circuit, when one step is selected from among the plurality of steps displayed on a display and a setting operation of setting the step as the last step within the range where the execution is skipped by the bypass circuit is performed on a dialog screen displayed on the display at this time, receiving the step as the last step, and when a plurality of steps on the upstream side relative to the last step is displayed on the dialog screen and one step is selected from among the plurality of steps thus displayed, receiving the step thus selected as the first step, the operation program includes a branch circuit that is able to execute control processes of the plurality of steps in parallel or selectively, and a merged circuit that merges execution process paths for the plurality of steps, the execution process paths being branched by the branch circuit; and in a case where the branch circuit and the merged circuit are placed on the upstream side relative to the last step, the method includes disallowing selection of steps between the branch circuit and the merged circuit as the first step.

* * * * *